United States Patent
Turk et al.

(10) Patent No.: US 6,345,074 B1
(45) Date of Patent: Feb. 5, 2002

(54) MAXIMUM LIKELIHOOD SERVO DETECTOR FOR DETECTING AN ERROR CORRECTING SERVO CODE RECORDED ON A DISC STORAGE MEDIUM

(75) Inventors: Stephen A. Turk, Longmont; David E. Reed, Westminster; Richard T. Behrens, Lafayette, all of CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/045,612

(22) Filed: Mar. 20, 1998

(51) Int. Cl.[7] .............................. H03D 1/00; H04L 27/06

(52) U.S. Cl. ........................ 375/341; 370/262; 360/53; 360/77.08; 714/794; 714/795; 714/796

(58) Field of Search ................................. 375/262, 263, 375/341; 360/46, 51, 77.08, 75, 53; 714/794, 795, 796

(56) References Cited

U.S. PATENT DOCUMENTS

| | | | |
|---|---|---|---|
| 5,274,510 A | 12/1993 | Sugita et al. | |
| 5,291,499 A | 3/1994 | Behrens et al. | |
| 5,384,671 A | 1/1995 | Fisher | |
| 5,424,881 A | 6/1995 | Behrens et al. | |
| 5,442,498 A | * 8/1995 | Cheung et al. | 360/77.08 |
| 5,497,384 A | 3/1996 | Fredrickson et al. | |
| 5,661,760 A | 8/1997 | Patapoutian et al. | |

OTHER PUBLICATIONS

Cideciyan, Dolivo, Hermann, Hirt, Schott, "A PRML System for Digital Magnetic Recording", IEEE Journal on Selected Areas in Communication vol. 10, No. 1, pp. 38–56, Jan. 1992.

Stephen B. Wicker, Error Control Systems for Digital Communication and Storage, pp. 290–332, Prentice–Hall, 1995.

* cited by examiner

Primary Examiner—Jean Corrielus
(74) Attorney, Agent, or Firm—Howard H. Sheerin; Dan A. Shifrin

(57) ABSTRACT

A disc storage system servo code detector is disclosed that provides enhanced error correction capabilities during both tracking and seeking by increasing a minimum distance $d_{min}$ between valid codewords and by increasing a minimum distance $\hat{d}_{min}$ from the signal space between adjacent codewords to the decision boundaries of all other valid codewords. The signal space with respect to the minimum distances is not a limiting aspect of the invention; however, in the preferred embodiment the codewords are selected to maximize the minimum distances in Euclidean space. Thus, the read signal is sampled and equalized according to a partial response spectrum, and maximum likelihood detection is employed to detect the servo codewords in Euclidean space. The code rate is selected according to certain design criteria such as the amount of error correction desired, the data density, and the cost and complexity of the encoder/decoder circuitry. After selecting the code rate and number of bits per codeword, a computer search is carried out to find a subset of codewords large enough to encode the track addresses while providing large minimum distance values for $d_{min}$ and $\hat{d}_{min}$.

21 Claims, 7 Drawing Sheets

| BINARY TRACK ADDRESS | GRAY CODE | NRZI CHANNEL DATA | FLUX PATTERN |
|---|---|---|---|
| 000 | 000 | 000000000000 | ++++++++++++ |
| 001 | 001 | 000000001010 | ++++++++--++ |
| 010 | 011 | 000010101010 | ++++--+--++ |
| 011 | 010 | 000010100000 | ++++--++++++ |
| 100 | 110 | 101010100000 | +--+--++++++ |
| 101 | 111 | 101010101010 | +--+--+--++ |
| 110 | 101 | 101000001010 | +--+++++--++ |
| 111 | 100 | 101000000000 | +--+++++++++ |

FIG. 3A
(Prior Art)

| BINARY TRACK ADDRESS | GRAY CODE | NRZI CHANNEL DATA | FLUX PATTERN |
|---|---|---|---|
| 000 | 000 | 100100100 | +---++---+--- |
| 001 | 001 | 100100010 | +---+++--- |
| 010 | 011 | 100010010 | +----++-- |
| 011 | 010 | 100010100 | +----++--- |
| 100 | 110 | 010010100 | ++---++--- |
| 101 | 111 | 010010010 | ++---+++-- |
| 110 | 101 | 010100010 | ++--+++-- |
| 111 | 100 | 010100100 | ++--+++--- |

FIG. 3B
(Prior Art)

| BINARY TRACK ADDRESS | NRZI CHANNEL DATA | PR4 SAMPLES |
|---|---|---|
| 000 | 001010001010 | 00++--00++-- |
| 001 | 001010101000 | 00++--++--00 |
| 010 | 010100010100 | 0++--00++--0 |
| 011 | 010101010000 | 0++--++--000 |
| 100 | 101000101000 | ++--00++--00 |
| 101 | 101000001010 | ++--0000++-- |
| 110 | 000010100000 | 0000++--0000 |
| 111 | 000101010100 | 000++--++--0 |

FIG.5

| BINARY TRACK ADDRESS | NRZI CHANNEL DATA | PR4 SAMPLES |
|---|---|---|
| 00000 | 010101010100000 | 0++--++--++0000 |
| 00001 | 010100000000100 | 0++--0000000++0 |
| 00010 | 010010101000010 | 0++0--++--000++ |
| 00011 | 001010010100010 | 00++--0++--00++ |
| 00100 | 100100010100010 | ++0--00++--00++ |
| 00101 | 101000101000010 | ++--00++--000++ |
| 00110 | 101010000001010 | ++--++00000--++ |
| 00111 | 000010101001010 | 0000++--++0--++ |
| 01000 | 010000101000000 | 0++000--++00000 |
| 01001 | 000010100001000 | 0000++--000++00 |
| 01010 | 000100010100000 | 000++00--++0000 |
| 01011 | 000001010101010 | 00000++--++--++ |
| 01100 | 000000100001010 | 000000++000--++ |
| 01101 | 010001010001010 | 0++00--++00--++ |
| 01110 | 100010001010010 | ++00--00++--0++ |
| 01111 | 000000010010100 | 0000000++0--++0 |
| 10000 | 000010000100010 | 0000++000--00++ |
| 10001 | 000000100101000 | 000000++0--++00 |
| 10010 | 000101010101000 | 000++--++--++00 |
| 10011 | 100001000001000 | ++000--0000++00 |
| 10100 | 101000001000000 | ++--0000++00000 |
| 10101 | 100100000101010 | ++0--0000++--++ |
| 10110 | 001010000101010 | 00++--000++--++ |
| 10111 | 001010000010000 | 00++--0000++000 |
| 11000 | 001000001000100 | 00++0000--00++0 |
| 11001 | 000001001010000 | 00000++0--++000 |
| 11010 | 101001010001000 | ++--0++--00++00 |
| 11011 | 101001000010100 | ++--0++000--++0 |
| 11100 | 101010101010100 | ++--++--++--++0 |
| 11101 | 000100101010100 | 000++0--++--++0 |
| 11110 | 000101000000010 | 000++--000000++ |
| 11111 | 100000010000010 | ++00000--0000++ |

FIG.6

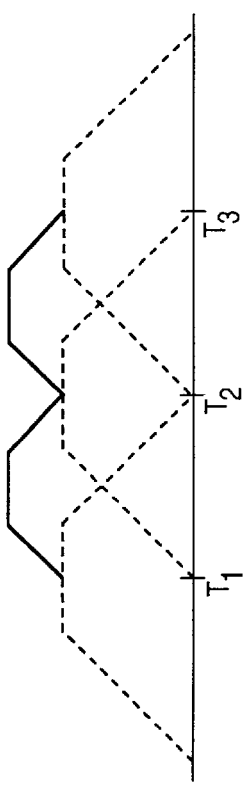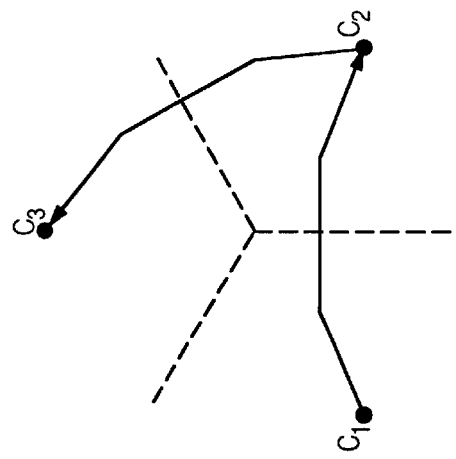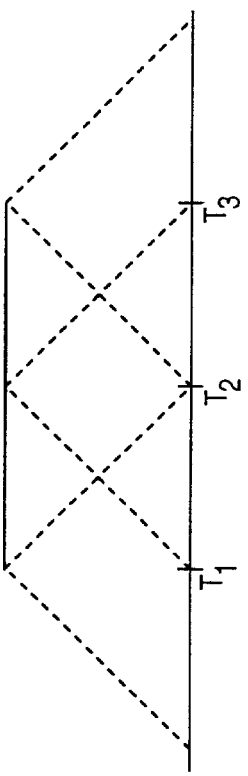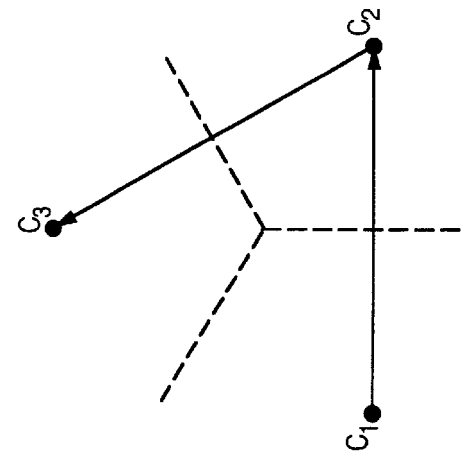
FIG. 7C
FIG. 7D
FIG. 7A
FIG. 7B

MAXIMUM LIKELIHOOD SERVO DETECTOR FOR DETECTING AN ERROR CORRECTING SERVO CODE RECORDED ON A DISC STORAGE MEDIUM

CROSS REFERENCE TO RELATED APPLICATIONS AND PATENTS

This patent is related to co-pending U.S. patent applications Ser. No. 08/790,038 now U.S. Pat. No. 6,005,727 entitled "A SERVO DECODER FOR DECODING AN ERROR CORRECTING SERVO CODE RECORDED ON A DISC STORAGE MEDIUM" and Ser. No. 08/961,727 now U.S. Pat. No. 6,023,386 entitled "A FAULT TOLERANT SYNC MARK DETECTOR FOR SYNCHRONIZING A TIME VARYING SEQUENCE DETECTOR IN A SAMPLED AMPLITUDE READ CHANNEL". The above referenced U.S. patent applications are hereby incorporated by reference.

FIELD OF INVENTION

The present invention relates to the control of disc storage systems for digital computers, particularly to a maximum likelihood servo detector for detecting codewords of an error correcting servo code.

BACKGROUND OF THE INVENTION

In computer storage systems (such as optical and magnetic disc drives) binary data are typically recorded on a disc storage medium as blocks or sectors 15 of information in radially spaced, concentric data tracks 13 as shown in FIG. 1A. During read and write operations, a transducer connected to a load beam actuated by a voice coil motor is positioned over the desired track by a servo controller (not shown). First, the servo controller performs a seek operation to move the transducer radially over the disc according to a predetermined velocity trajectory until the transducer reaches the desired data track. Once at the desired track, the servo controller performs a tracking operation by making fine position adjustments to maintain the transducer over the centerline of the track while the data is being recorded or retrieved.

The servo controller is a closed loop feedback system that uses the target data track and the transducer states (position, velocity, acceleration, etc.) to generate the control signals. The transducer position relative to the disc storage medium is typically determined using either a dedicated servo disc in a disc array, or using embedded servo sectors. In the latter embodiment, servo sectors are pre-recorded at periodic intervals around the circumference of the disc in each data track to form "servo wedges" or "servo spokes" 17 that extend from the inner diameter to outer diameter tracks as shown in FIG. 1A. In this manner, as the disc spins underneath the transducer, the servo sectors 17 provide a periodic update of the transducer's current radial and centerline location.

A typical servo sector 17, as shown in FIG. 1B, comprises a preamble 68, a sync mark 70 and servo data 71. The preamble 68 allows the recording system to nominalize timing recovery and the gain of the read signal before reading the servo data 71, and the sync mark 70 allows the recording system to byte synchronize to the servo data 71 so that it can be decoded. The servo data 71 comprises a track address 73 for computing a coarse radial position of the transducer during seeks, and servo bursts 75 for computing a fine centerline position of the transducer during tracking.

The track addresses are recorded phase coherent throughout the servo wedges meaning that they occur in the same location within the servo wedge from the outer diameter to the inner diameter track. Furthermore, the track address are typically recorded in a manner that ensures accurate detection during seek operations when the head flies across adjacent tracks as it moves radially over the disc. In other words, the track addresses are encoded using a servo code which ensures that the ambiguity caused by intertrack interference will be resolved in favor of one or the other adjacent track addresses.

Conventionally, the track addresses are first encoded into a Gray code, a code wherein adjacent codewords are different in only one bit (in NRZ). The Gray codewords are then written to the disc in a manner that ensures the flux patterns of adjacent track addresses are the same except where they differ by the single bit in the Gray codeword (if the flux patterns are the same, there is no intertrack interference). Two well known methods for modulating the Gray codewords to achieve this effect are dibit modulation, shown in FIG. 3A, and pulse-position modulation, shown in FIG. 3B.

In dibit modulation, a Gray code "1" bit modulates a RLL d=1 dibit transition ("1010" in NRZI) and a Gray code "0" bit modulates no dibit transition ("0000" in NRZI). In FIG. 3A, for example, three bits of binary track address are encoded into three bits of Gray code, where each "1" bit of the Gray code modulates a dibit transition and each "0" bit no dibit transition. Thus, the overall code rate of the dibit servo code is ¼ (i.e., 1 bit of binary data is encoded into 4 bits of channel data). Notice that the flux patterns of adjacent track addresses in FIG. 3A are the same except at the location where they differ by one bit in the Gray code. Therefore, there is no intertrack interference in the read signal, other than at the changing Gray code bit, even when the transducer is in-between tracks during a seek operation. The ambiguity in the Gray code bit will be resolved in favor of one or the other adjacent track addresses.

In pulse-position modulation, a Gray code "1" bit modulates a NRZI sequence of "10" and a Gray code "0" bit modulates a NRZI sequence of "01". To reduce the undesirable effect of non-linear transition shift similar to the above RLL d=1 dibit modulation, a NRZI "0" bit is inserted between the NRZI sequences such that a Gray code "1" bit modulates a NRZI sequence of "100" and a Gray code "0" bit modulates a NRZI sequence of "010" as illustrated in FIG. 3B. Notice again that the resulting flux patterns of adjacent track addresses are the same except at the location of the changing Gray code bit. The advantage of the pulse-position modulation code over the dibit modulation code is a higher code rate (rate ⅓ as compared to rate ¼).

Although encoding the track addresses using a conventional Gray code together with dibit or pulse-position modulation enables accurate detection of the track addresses during a seek operation, a conventional Gray code does not protect against detection errors when noise in the channel, other than intertrack interference, corrupts the read signal. In other words, a conventional Gray code does not provide any distance enhancing properties typically found in a conventional error correction code (ECC), such as a Hamming code, because the minimum distance between the codewords of a Gray code is only one bit. Conventional ECC codes have not been employed to encode servo track addresses because it is not possible to arrange the ECC codewords to achieve exactly the same effect as a Gray code (i.e. where adjacent ECC codewords differ in only one bit).

The above referenced U.S. co-pending patent application entitled "A SERVO DECODER FOR DECODING AN ERROR CORRECTING SERVO CODE RECORDED ON A DISC STORAGE MEDIUM" discloses an ECC servo code for encoding the track addresses in a manner that achieves the same effect as a conventional Gray code, in addition to an error correction distance enhancement, particularly while tracking the centerline of a data track. An enabling aspect of that patent application is to encode the track address using a servo code having a particular minimum distance $d_{min}$ between codewords, and then to arrange the codewords such that adjacent codewords differ by $d_{min}$. This is understood with reference to FIG. 4A which shows three servo codewords in a two-dimensional space, where each codeword is enclosed by a circle of radius $d_{min}/2$. Codewords detected within one of the circles are decoded into the codeword at the center of the circle, thereby providing an error correction capability of $d_{min}/2$.

The servo code in the above co-pending patent application also achieves the same effect as a conventional Gray code during a seek operation. Codewords detected when the transducer is in-between tracks will decode into one or the other adjacent track addresses. For example, codewords detected in the signal space represented as a linear segment between $C_1$ and $C_2$ in FIG. 4A will be decoded into either $C_1$ or $C_2$ because they fall within either of the corresponding circles. However, if the signal space near the center of the linear segment is too close to the decision boundary of another valid codeword, such as C3, then noise in the channel other than intertrack interference may cause a codeword to be detected in the shaded area which would decode erroneously into $C_3$.

It is, therefore, an object of the present invention to provide an error correcting servo code with a minimum distance of $d_{min}$ between valid codewords, thereby providing an error correction capability of $d_{min}/2$ during tracking. A further object of the present invention is to provide a servo code with a minimum distance of $\hat{d}_{min}$ from the signal space between adjacent codewords to the decision boundaries of all other valid codewords, thereby providing an error correction capability of $\hat{d}_{min}$ when the transducer is in-between tracks during a seek operation.

SUMMARY OF THE INVENTION

A disc storage system servo code detector is disclosed that provides enhanced error correction capabilities during both tracking and seeking by increasing a minimum distance din between valid codewords and by increasing a minimum distance $\hat{d}_{min}$ from the signal space between adjacent codewords to the decision boundaries of all other valid codewords. The signal space with respect to the minimum distances is not a limiting aspect of the invention; however, in the preferred embodiment the codewords are selected to maximize the minimum distances in Euclidean space. Thus, the read signal is sampled and equalized according to a partial response spectrum, and maximum likelihood detection is employed to detect the servo codewords in Euclidean space. The code rate is selected according to certain design criteria such as the amount of error correction desired, the data density, and the cost and complexity of the encoder/decoder circuitry. After selecting the code rate and number of bits per codeword, a computer search is carried out to find a subset of codewords large enough to encode the track addresses while providing large minimum distance values for $d_{min}$ and $\hat{d}_{min}$.

BRIEF DESCRIPTION OF THE DRAWINGS

The above and other aspects and advantages of the present invention will be better understood by reading the following detailed description of the invention in conjunction with the drawings, wherein:

FIG. 3A shows a prior art rate ¼ servo code implemented using a conventional Gray code and RLL D=1 dibit modulation.

FIG. 3B shows a prior art rate ⅓ servo code implemented using a conventional Gray code and pulse-position modulation.

FIG. 5 shows a rate ¼ error correcting servo code constructed according to the present invention.

FIG. 6 shows a rate ⅓ error correcting servo code constructed according to the present invention.

FIG. 7A is a simple linear model of the read signal and the effect of intertrack interference.

FIG. 7B shows the linear signal space that would be traversed as the transducer flies between adjacent tracks during a seek operation when the read signal model conforms to FIG. 7A.

FIG. 7C is a model of the read signal and the effect of intertrack interference for a typical "write wide" MR recording system.

FIG. 7D shows the signal space that would be traversed as the transducer flies between adjacent tracks during a seek operation when the read signal model conforms to FIG. 7C.

DETAILED DESCRIPTION OF THE PREFERRED EMBODIMENT

Data Format

Figure 1A:
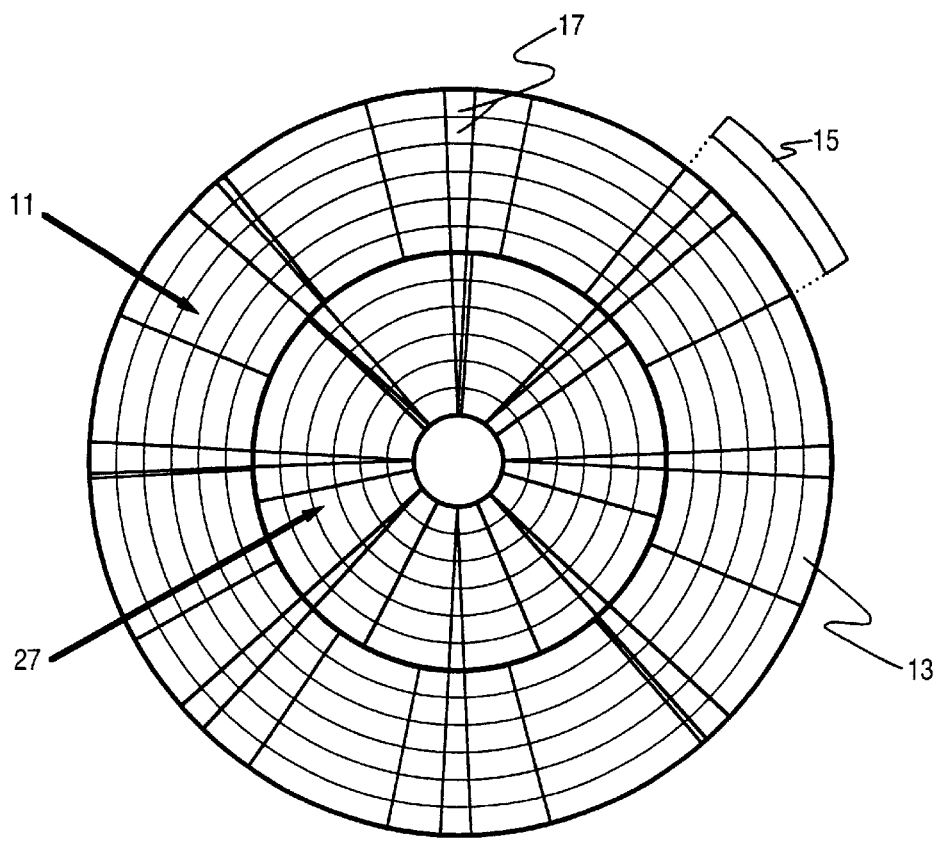
FIG. 1A shows an example format of a disc storage medium comprised of a plurality of concentric data tracks and embedded servo wedges, where each data track is partitioned into a plurality of data sectors.
Figure 1B:
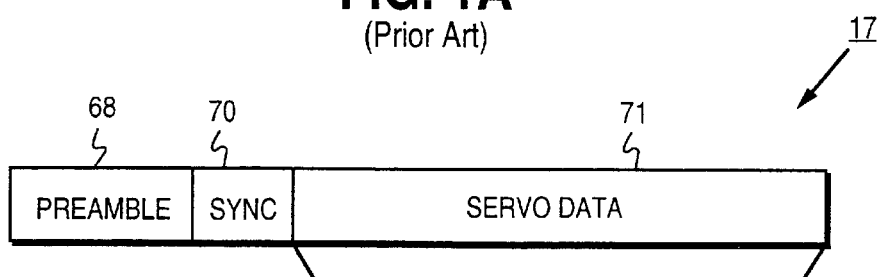
FIG. 1B shows an example format of a servo sector of a servo wedge, where the servo data typically comprises a track address for coarse positioning of the recording head over the disc, and servo bursts for fine positioning the recording head over a centerline of the track.

FIG. 1A shows an exemplary data format of a storage disc comprising a series of concentric data tracks 13 wherein each data track 13 comprises a plurality of sectors 15 with embedded servo wedges 17. The embedded servo wedges are typically written onto the disc using a specialized servo writer after the disc is manufactured; it is important that the storage system not overwrite the servo wedges during normal operation. Each servo sector of a servo wedge comprises a preamble 68 and sync field 70 for synchronizing to the servo data 71 as shown in FIG. 1B. The servo data 71 typically comprises a track address 73 for coarse positioning the recording head over a selected track during seeks, and servo bursts 75 for fine positioning the recording head over a centerline of the selected track while writing and reading data during tracking. Additionally, the servo data may comprise data used to locate the relative position of the data sectors rather than record a separate "ID-field" before each data sector. The track addresses 73 are typically detected by an analog or discrete time pulse detector, but they may also be detected using a discrete time sequence detector in a sampled amplitude read channel. The servo bursts 75 are typically detected using an analog or discrete time burst area detector.

The storage capacity at the outer tracks can be increased due to the increase in circumferential recording area and the decrease in intersymbol interference. Accordingly, the disc shown in FIG. 1A is partitioned into an outer zone 11 comprising fourteen data sectors per track, and an inner zone 27 comprising seven data sectors per track. In practice, the disc is actually partitioned into several zones, wherein the capacity and data rate increases from the inner to outer zones.

During a seek operation, as the recording head traverses radially over the disc toward a target track, the head may span two adjacent tracks when reading the servo wedges. In this situation, the intertrack interference between adjacent track addresses will induce ambiguity into the detected codeword. For this reason it is important to encode the track addresses such that the ambiguity is resolved in favor of one or the other adjacent track addresses. Conventionally, track addresses are encoded according to a Gray code constraint, meaning that adjacent track address differ in only one bit (in NRZ). In this manner, the ambiguity in the one differing bit will always be resolved in favor of one of the two adjacent track addresses.

Figure 1C:
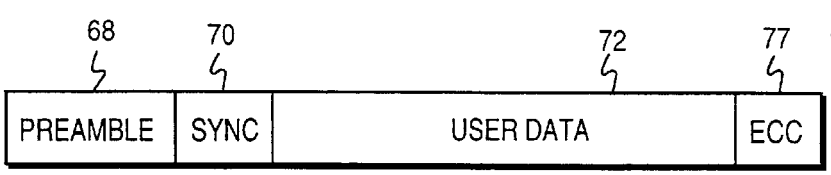
FIG. 1C shows an example format of a data sector of a data track.

FIG. 1C shows an example format of a data sector 15 within a track 13. Similar to a servo sector 17, a data sector 15 comprises a preamble field 68 and a sync field 70 for synchronizing to the sector data (i.e., the user data 72). Additionally, a data sector typically comprises a number of redundancy bytes 77 associated with a predetermined error correcting code (ECC) for use in detecting and correcting errors in the user data 72 induced by noise in the read signal upon read back. Conventional ECC is normally not employed to correct errors in the servo track addresses 73 because it is not possible to arrange ECC codewords according to the above described conventional Gray code constraint. That is, it is not possible to encode servo track addresses using a conventional ECC code, and then to arrange the codewords such that adjacent codewords differ in only one NRZ bit.

As will become more apparent from the following description, the present invention provides an improvement over a conventional Gray code by encoding the servo addresses using an ECC code, and arranging the codewords such that adjacent codewords are different relative to a minimum distance of the code. In this manner, the ambiguity created when the transducer spans adjacent tracks during a seek operation will be resolved in favor of one of the adjacent tracks, similar to the effect provided by the conventional Gray code constraint. However, the present invention also provides an advantage over a conventional Gray code in that it is capable of correcting errors in the detected codewords, both when seeking and tracking, thereby enhancing the reliability of the servo control and allowing the servo data to be recorded at a higher density.

Sampled Amplitude Read Channel

Figure 2:
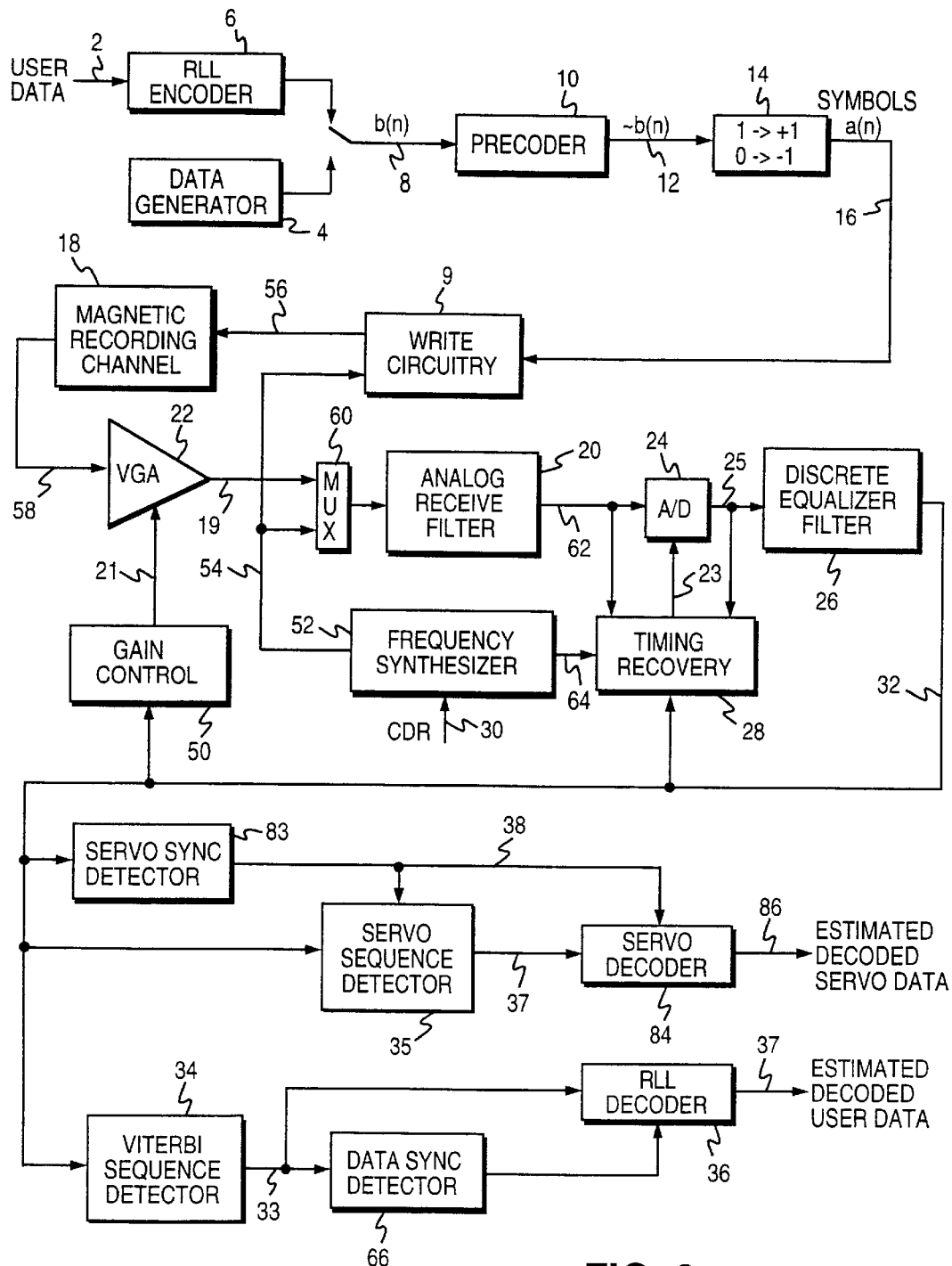
FIG. 2 is a block diagram of a sampled amplitude read channel comprising a Viterbi sequence detector for detecting the user data in the data sectors and a maximum likelihood servo detector for detecting the servo codewords in the servo wedges.

The servo detector of the present invention is preferably implemented using maximum likelihood sequence detection which requires the analog read signal to be sampled, the samples synchronized to the baud rate, and the samples equalized into a predetermined partial response. Thus, the present invention is ideally suited to operate within a disc storage system comprising a sampled amplitude read channel, such as a partial response maximum likelihood (PRML) read channel, which already comprises the sampling, synchronizing, and equalizing circuitry necessary to implement the present invention. A block diagram of a sampled amplitude read channel incorporating the maximum likelihood servo detector of the present invention is shown in FIG. 2.

During a write operation, a data generator 4 outputs preamble data 68 and a sync mark 70 recorded on the disc prior to recording the user data 72 (see FIG. 1C). An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating ~b(N)=0 into a(N)=−1, and ~b(N)=1 into a(N)=+1. Write circuitry 9, responsive to the symbols a(n) 16, modulates the current in the recording head coil (or intensity of a laser beam) at the baud rate 1/T to record the binary sequence onto the disc storage medium. A frequency synthesizer 52 provides a baud rate write clock 54 to the write circuitry 9 and is adjusted by a channel data rate signal (CDR) 30 according to the zone the transducer is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to frequency and phase lock to the acquisition preamble 68 recorded on the disc preceding the recorded user data 72. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response.

After equalization, the equalized sample values 32 are applied to a decision directed gain control 50 and timing recovery 28 circuit for adjusting the amplitude of the read signal 58 and the frequency and phase of the sampling device 24, respectively. Timing recovery 28 adjusts the frequency of sampling device 24 over line 23 in order to synchronize the equalized samples 32 to the baud rate, and gain control 50 adjusts the gain of variable gain amplifier 22 over line 21 in order to match the magnitude of the channel's frequency response to the desired partial response. Frequency synthesizer 52 provides a course center frequency setting to the timing recovery circuit 28 over line 64 in order to center the timing recovery frequency over temperature, voltage, and process variations.

In partial response recording, the desired channel response is often selected from Table 1:

TABLE 1

| Channel | Transfer Function | Dipulse Response |
| --- | --- | --- |
| PR4 | $(1 - D)(1 + D)$ | $0, 1, 0, -1, 0, 0, 0, \ldots$ |
| EPR4 | $(1 - D)(1 + D)^2$ | $0, 1, 1, -1, -1, 0, 0, \ldots$ |
| EEPR4 | $(1 - D)(1 + D)^3$ | $0, 1, 2, 0, -2, -1, 0, \ldots$ |

In Table 1, the dipulse response is the response of the recording channel to a pulse input (e.g., applying a positive write current for one symbol period in magnetic recording). The output of the channel is then the linear combination of time-shifted dipulse responses modulated by the input data sequence, where a "1" bit (positive current) modulates a positive dipulse and a "0" bit (negative current) modulates a negative dipulse. Stated differently, the output of the channel is the convolution of the input symbols (+1, −1) with the dipulse response of the channel. Sampling the analog read signal synchronous to the baud rate will generate a sequence of samples consistent with the partial response signaling employed, thereby allowing demodulation (i.e., deconvolution) into the recorded input sequence by evaluating the samples in context. Noise in the recording channel, due to misequalization, timing errors, gain errors, flaws in the recording medium, etc., will obfuscate the read signal thereby creating ambiguity in determining the binary input sequence (recorded sequence) that could have generated the output sample sequence.

The ambiguity in demodulating the read signal is resolved in favor of the most likely input sequence to have generated the output sample sequence. That is, a discrete time sequence detector 34, such as a Viterbi sequence detector, evaluates the read signal samples by computing and accumulating error metrics along the paths of a trellis. The input sequence which generates the minimum error metric is selected as the most likely sequence to have generated the read signal sample sequence. In Viterbi sequence detection, the error metric is typically computed as the squared difference between the read signal samples and the ideal partial response samples that would have been generated by a given input sequence in the absence of noise in the channel. Thus, a Viterbi detector is a maximum likelihood detector in Euclidean space (or an approximation thereof depending on how the equalizers correlate the noise).

The output of the Viterbi detector 34 is an estimated binary sequence 33 of RLL encoded data. An RLL decoder 36 decodes the estimated binary sequence 33 into estimated user data 37 which is ultimately transferred to a disk controller (not shown) for error correction processing before being transferred to the host system. Before RLL decoding, the RLL codewords in the estimated binary sequence 33 must be framed or delineated. To this end, a data sync detector 66 enables operation of the RLL decoder 36 after detecting the sync mark 70 recorded just prior to the user data field 72 as shown in FIG. 1C.

In the preferred embodiment of the present invention, a maximum likelihood detector (servo detector 35) is also used to detect the track addresses recorded in the servo wedges 17 from the equalized sample values 32. As described in more detail below, the servo sequence detector is matched to the servo codewords in order to fix the decision boundaries for the codewords in Euclidean space. This requires that the servo sync mark 70 of FIG. 1B be detected upstream from the servo detector so that the read signal samples of each codeword are framed appropriately. Therefore, a special servo sync mark detector 83 is employed for detecting the servo sync mark 70 from the equalized sample values 32 rather than from a detected binary sequence as with the data sync detector 66. The servo sync mark detector 83 enables operation of both the servo detector 35 and a servo decoder 84 which decodes the detected servo track addresses 37 into estimated decoded servo data 86. Details concerning the preferred embodiment for the servo sync detector 83 are disclosed in the above referenced patent application entitled "A FAULT TOLERANT SYNC MARK DETECTOR FOR SYNCHRONIZING A TIME VARYING SEQUENCE DETECTOR IN A SAMPLED AMPLITUDE READ CHANNEL". Details of the servo detector 35 and servo decoder 84 which operate according to the ECC servo code of the present invention are set forth in the following sections.

Servo Detector/Decoder

The servo detector 35 of FIG. 2 is responsible for detecting the track addresses recorded in the servo wedges, even when ambiguity is induced in the read signal due to intertrack interference during a seek operation. In addition, the servo code of the present invention is designed to increase the minimum distance between codewords of adjacent tracks, as well as the minimum distance measured from the signal space between codewords of adjacent tracks and all other valid codewords. This increase in minimum distance provides an advantage over a conventional Gray code it provides an error correction capability for correcting errors caused by noise other than intertrack interference. This error correction capability increases the effective signal-to-noise ratio (SNR) thereby allowing the servo data to be recorded at a higher density and/or allowing an increase in the seek velocity without degrading the performance of the servo system.

Figure 4A:
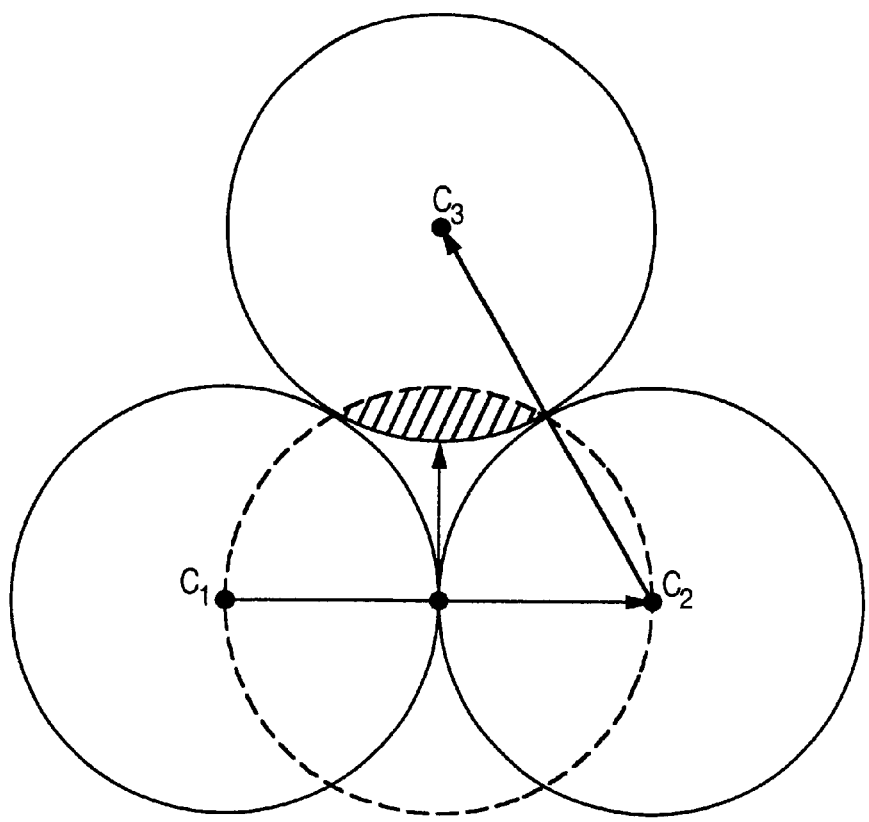
FIG. 4A illustrates how the codewords of an ECC code can be arranged according to the minimum distance of the code to achieve the same effect as a conventional Gray code.
Figure 4B:
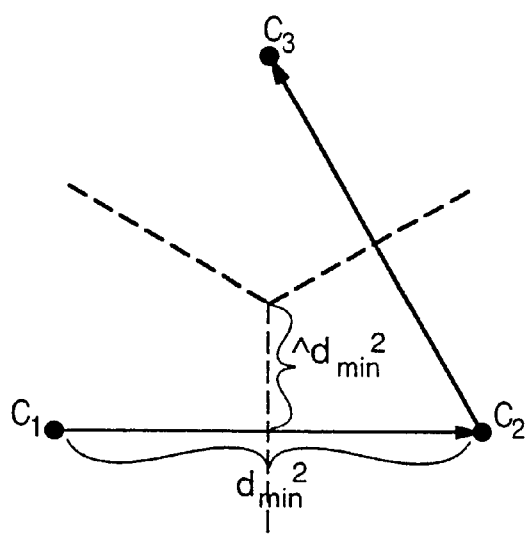
FIG. 4B illustrates how the servo code of the present invention is designed to increase the minimum distance $d_{min}$ between valid codewords as well as the minimum distance $\hat{d}_{min}$ from the signal space between adjacent valid codewords and the detection boundaries of all other valid codewords.

The distance enhancing properties provided by the servo code of the present invention are understood with reference to FIG. 4B which shows three servo codewords in a two-dimensional space. These codewords, designated C1, C2 and C3, represent track addresses of adjacent tracks. The signal space shown as a linear segment connecting the codewords represents the read signal generated as the transducer traverses radially over the tracks during a seek operation. The dashed lines represent the decision boundaries in for each codeword—the servo detector 35 will output the codeword closest to the current value for the read signal relative to the decision boundaries.

To achieve a similar effect as a conventional Gray code, the codewords are ordered such that codewords representing adjacent tracks differ by the minimum distance $\hat{d}_{min}$ of the code (i.e., the minimum distance between all valid codewords). In this manner, when the transducer is flying between tracks during a seek operation, the ambiguity in the read signal due to intertrack interference will be resolved in favor of one or the other adjacent codewords. For example, as the transducer traverses the linear segment between C1 and C2 of FIG. 4B, the servo detector 35 will output either C1 or C2 as the closest codeword to the read signal.

Note that as the transducer traverses the linear segment between C1 and C2, the distance to other valid codewords, such as C3, may decrease becoming a minimum at some point (e.g., the midpoint) between C1 and C2. Consequently, noise in the read signal other than intertrack interference may cause the read signal to cross the decision boundary such that C3 is erroneously detected as the track address adjacent to C1. To help prevent this, the servo code of the present invention is designed to increase the minimum distance $\hat{d}_{min}$, the distance measured from the signal space between adjacent codewords and all other valid codewords. Increasing the minimum distances $d_{min}$ and $\hat{d}_{min}$ increases the error correction capability of the code, that is, the amount of noise the system can tolerate before a codeword is erroneously detected.

Those skilled in the art understand that the distance of a code can be increased in various ways and in different domains. For example, the distance of an error correction code (ECC), referred to as the Hamming distance, is measured in the binary domain (the difference in bits between valid codewords) The aspects of the present invention are applicable irrespective of the domain. The preferred embodiment, however, is to design the servo code so as to increase the minimum distances in the Euclidean domain, that is, to increase the accumulated squared differences $d_{min}^2$ and $\hat{d}_{min}^2$ between samples of the read signal and the ideal samples of the codewords.

The method for selecting the servo codewords is heuristic and involves the use of computer search programs. First, a codeword set with a desired $d_{min}^2$ is selected where the codewords can be ordered such that adjacent codewords differ by $d_{min}^2$. For each possible ordering, a computer search approximates the minimum distance $\hat{d}_{min}^2$ and saves the ordering that generates the maximum $\hat{d}_{min}^2$. The processes is then repeated for different values of $d_{min}^2$ until the optimum values for both $d_{min}^2$ and $\hat{d}_{min}^2$ are determined for a given code rate and codeword length.

Specifically, the steps for selecting the codeword set and the appropriate ordering relative $d_{min}^2$ to are as follows:

1. Determine the desired code rate and codeword length. For example, choose rate $1/4=3/12$ and hence the codeword length is n=12 bits.
2. Divide the set of all $2^n$ codewords into two sets: an A set comprising codewords with an even number of NRZI "1" bits, and a B set comprising codewords with an odd number of NRZI "1" bits.
3. Select a minimum distance $d_{min}^2$ for the code.
4. For each A and B set, use a computer search program to find the largest subset of codewords which differ from one another by at least $d_{min}^2$. Call these subsets $A_s$ and $B_s$, respectively.
5. Determine whether either subset $A_s$ or $B_s$ comprises enough codewords to encode all of the servo track addresses. If not, return to step 1 and select a smaller code rate or return to step 3 and select a smaller $d_{min}^2$.
6. Choose a subset $A_s$ or $B_s$ that has enough codewords to encode all of the track addresses and order the codewords such that adjacent codewords differ by exactly $d_{min}^2$ as follows:
    a. Choose a starting codeword.
    b. Determine the group of codewords with distance exactly $d_{min}^2$ from the current codeword.
    c. Choose one of the codewords from the group to be the next codeword in the ordering.
    d. Repeat steps b and c until enough codewords are used to encode all of the track addresses.
7. Use a computer program to measure the approximate distance $\hat{d}_{min}^2$ from the signal space between adjacent codewords in the ordering to all other codewords in the ordering.
8. Repeat steps 6 and 7 with a different subset $A_s$ or $B_s$ and with different starting codewords; save the ordering that generates the largest measured $\hat{d}_{min}^2$.
9. Repeat the entire process starting at step 3 with a different $d_{min}^2$ and select the ordered codeword set that generates the optimum (largest) values for both $d_{min}^2$ and $\hat{d}_{min}^2$ to encode the track addresses.

To illustrate the above procedure, consider the case where the code rate is selected to be 1/4 and the codeword length selected to be n=12 bits. The following subset of codewords all have an even number of NRZI "1" bits and all differ by at least $d_{min}^2=12$:

| Rate 3/12 Servo Codewords | |
|---|---|
| NRZI | PR4 Samples |
| 000010100000 | 0000++--0000 |
| 000101010100 | 000++--++--0 |
| 001010001010 | 00++--00++-- |
| 001010101000 | 00++--++--00 |
| 010100010100 | 0++--00++--0 |
| 010101010000 | 0++--++--000 |
| 101000001010 | ++--0000++-- |
| 101000101000 | ++--00++--00 |

To find a valid ordering for this set, one of the codewords is selected arbitrarily as the starting codeword, and the codewords that differ by exactly $d_{min}^2$ are listed below that codeword. One of the codewords is selected from the list to be the next codeword in the ordering (designated by the letter "f"), and the codewords that differ by exactly $\hat{d}_{min}^2$ are listed below the selected codeword (codewords marked "u" in the list have already been used). This process continues until enough codewords have been selected to encode all of the track addresses.

```
process continues until enough codewords have been selected
to encode all of the track addresses.
00++--00++--                    (selected initially)
00++--++--00f
0++--00++--0
++--0000++--
000++--++--0
00++--++--00                    (next codeword)
00++--00++--u
0++--00++--0f
++--00++--00
0++--00++--0                    (next codeword)
00++--00++--u
00++--++--00u
0++--++--000f
++--0000++--
++--00++--00
000++--++--0
0++--++--000                    (next codeword)
0++--00++--0u
++--00++--00f
0000++--0000
++--00++--00                    (next codeword)
00++--++--00u
0++--00++--0u
0++--++--000u
++--0000++--f
++--0000++--                    (next codeword)
00++--00++--u
0++--00++--0u
++--00++--00u
0000++--0000f
0000++--0000                    (next codeword)
0++--++--000u
++--0000++--u
000++--++--0f
000++--++--0                    (next codeword)
00++--00++--u
0++--00++--0u
0000++--0000u
```

The final ordering for the above rate $1/4=3/12$ servo code is shown in FIG. 5. This particular servo code exhibits a minimum distance $d_{min}^2=12$ (exactly) between codewords, and a minimum distance $\hat{d}_{min}^2=1.5$ (approximate) from the signal space between adjacent codewords to all other valid codewords in the ordered set. The minimum distances were measured in Euclidean space with the codewords represented as partial response class-IV signals having sample values normalized to +1, 0 and −1. Through computer simulations it has been determined that this servo code provides approximately 1.75 dB in coding gain over the prior art rate 1/4 dibit modulation code shown in FIG. 3A.

Applying the search procedures of the present invention to a rate $1/3=5/15$ code yields the servo code shown in FIG. 6. This particular servo code exhibits a minimum distance $d_{min}^2=8$ (exactly) between codewords, and a minimum distance $\hat{d}_{min}^2=0.8$ (approximate) from the signal space between adjacent codewords to all other valid codewords in the ordered set. Again, the minimum distances were measured in Euclidean space with the codewords represented as partial response class-IV signals having sample values normalized to +1, 0 and −1. Through computer simulations it has been determined that this servo code provides approximately 2 dB in coding gain over the prior art rate 1/3 pulse-position modulation code shown in FIG. 3B.

In order to encode all the track addresses on a disc, the servo codewords are concatenated to form a track address of length nxm where n is the number of servo codewords concatenated and m is the size of one servo codeword. The number of track address that can be encoded is then $2^{nxmxr}$ where r is the code rate of the servo code. In order to maintain the Gray code effect when the codewords are concatenated, a special ordering is employed to ensure that only one codeword changes between track addresses.

First, the least significant codeword W0 is sequenced in a forward order, then the next significant codeword W1 is changed and the least significant codeword W0 is sequenced in reverse order. When the next significant W1 codeword has run through its sequence, then the next codeword W2 is changed and the W1 codeword is sequenced in a reverse order. This is illustrated below where the servo code comprises eight codewords such as in FIG. 5, and when eight codewords W0–W7 are concatenated to form the track address:

| | | | | | | | |
|---|---|---|---|---|---|---|---|
| $W7_0$ | $W6_0$ | $W5_0$ | $W4_0$ | $W3_0$ | $W2_0$ | $W1_0$ | $W0_0$ |
| $W7_0$ | $W6_0$ | $W5_0$ | $W4_0$ | $W3_0$ | $W2_0$ | $W1_0$ | $W0_1$ |
| : | | | | | | | |
| $W7_0$ | $W6_0$ | $W5_0$ | $W4_0$ | $W3_0$ | $W2_0$ | $W1_0$ | $W0_7$ |
| $W7_0$ | $W6_0$ | $W5_0$ | $W4_0$ | $W3_0$ | $W2_0$ | $W1_1$ | $W0_7$ |
| $W7_0$ | $W6_0$ | $W5_0$ | $W4_0$ | $W3_0$ | $W2_0$ | $W1_1$ | $W0_6$ |
| : | | | | | | | |
| $W7_0$ | $W6_0$ | $W5_0$ | $W4_0$ | $W3_0$ | $W2_0$ | $W1_1$ | $W0_0$ |
| $W7_0$ | $W6_0$ | $W5_0$ | $W4_0$ | $W3_0$ | $W2_0$ | $W1_2$ | $W0_0$ |
| $W7_0$ | $W6_0$ | $W5_0$ | $W4_0$ | $W3_0$ | $W2_0$ | $W1_2$ | $W0_1$ |
| : | | | | | | | |
| $W7_0$ | $W6_0$ | $W5_0$ | $W4_0$ | $W3_0$ | $W2_0$ | $W1_2$ | $W0_7$ |
| $W7_0$ | $W6_0$ | $W5_0$ | $W4_0$ | $W3_0$ | $W2_0$ | $W1_3$ | $W0_7$ |
| $W7_0$ | $W6_0$ | $W5_0$ | $W4_0$ | $W3_0$ | $W2_0$ | $W1_3$ | $W0_6$ |
| : | | | | | | | |
| $W7_0$ | $W6_0$ | $W5_0$ | $W4_0$ | $W3_0$ | $W2_0$ | $W1_7$ | $W0_0$ |
| $W7_0$ | $W6_0$ | $W5_0$ | $W4_0$ | $W3_0$ | $W2_1$ | $W1_7$ | $W0_0$ |
| $W7_0$ | $W6_0$ | $W5_0$ | $W4_0$ | $W3_0$ | $W2_1$ | $W1_7$ | $W0_1$ |
| : | | | | | | | |
| $W7_0$ | $W6_0$ | $W5_0$ | $W4_0$ | $W3_0$ | $W2_1$ | $W1_7$ | $W0_7$ |
| $W7_0$ | $W6_0$ | $W5_0$ | $W4_0$ | $W3_0$ | $W2_1$ | $W1_6$ | $W0_7$ |
| $W7_0$ | $W6_0$ | $W5_0$ | $W4_0$ | $W3_0$ | $W2_1$ | $W1_6$ | $W0_6$ |
| : | | | | | | | |

The above process is iterated throughout all of the codewords such that only one codeword is changing between adjacent track addresses.

The minimum distances $\hat{d}_{min}$ for the servo codes of FIG. 5 and FIG. 6 were measured assuming that the model for intertrack interference is a linear segment between the signal space of adjacent codewords. This model would be accurate if the read signal was the linear combination of the isolated read signals generated from each track as shown in FIG. 7A. The dashed lines in FIG. 7A represent the isolated read signals generated relative to the centerline of each track $T_1$, $T_2$, $T_3$, etc. The magnitude of each read signal is simply a linear function of the distance from the track's centerline. The solid line in FIG. 7A represents the signal space between codewords of adjacent tracks shown as linear segments in FIG. 7B.

The linear segment model of intertrack interference illustrated in FIG. 7A and FIG. 7B may not be accurate in every instance. For example, in a magnetic disc storage system employing an inductive write element and a magnetoresitive (MR) read element, the resulting read signal may be modeled as shown in FIG. 7C due to the "wide write" characteristic of such recording devices. Thus, the resulting signal space between codewords of adjacent tracks, as shown in FIG. 7D, might be more complex than a simple linear segment. However, it is within the ability of those skilled in the art to modify the computer search program to take into account different models for the intertrack interference when searching for the minimum distance $\hat{d}_{min}^2$ for a particular set of codewords.

In order to fix the decision boundaries (shown as dashed lines in FIG. 7B and 7D), the servo detector 35 of FIG. 2 is designed to compute error metrics only with respect to the valid codewords of the servo code. As described above, this requires that the servo sync mark 70 of FIG. 1B be detected from the equalized sample values 32 upstream from the servo detector so that the sample values representing the codewords are properly framed before computing the error metrics. Once the servo sync mark 70 is detected, the samples representing the first servo codeword are loaded into the servo detector 35 and the error metrics computed.

Figure 8:
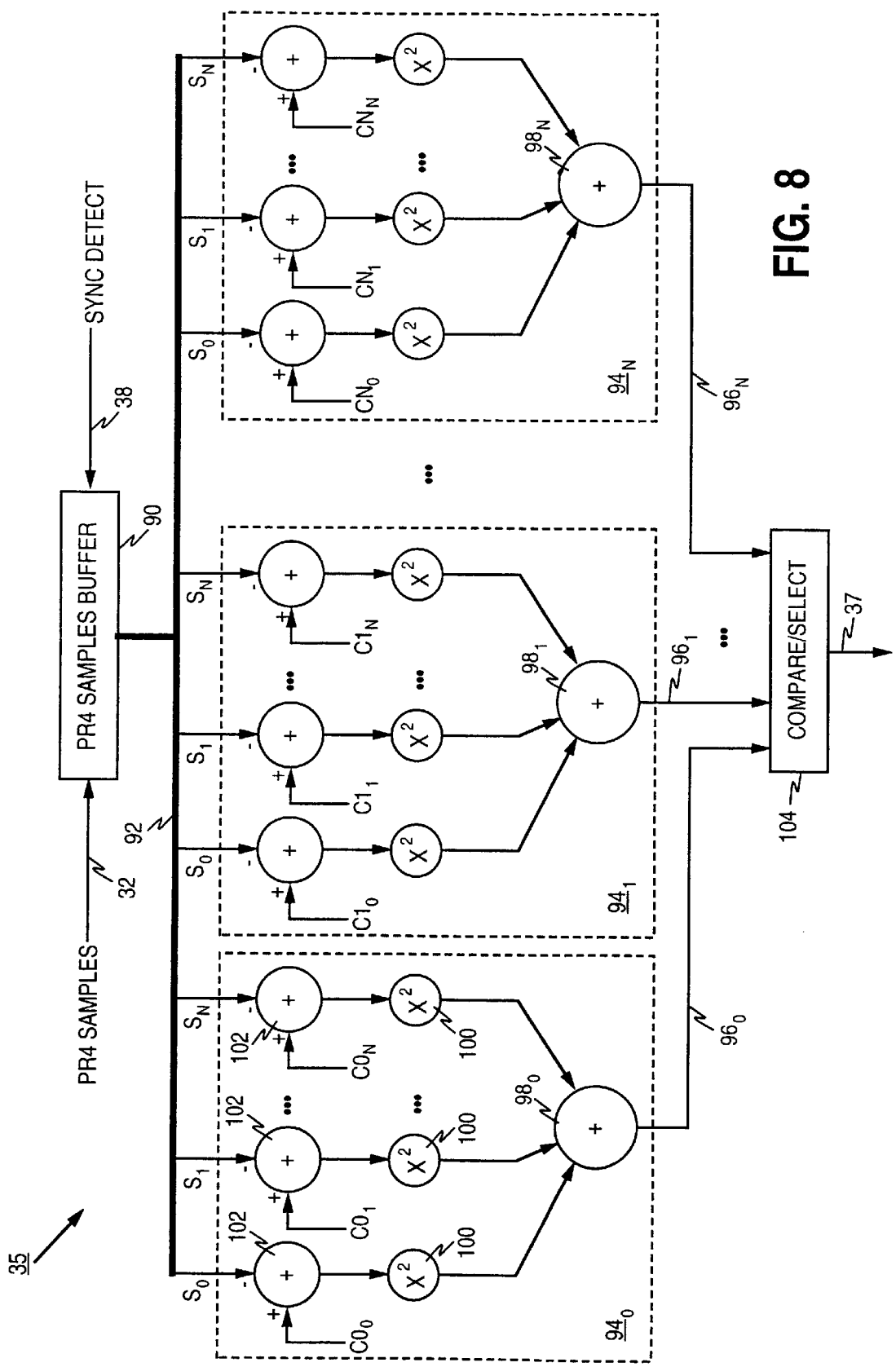
FIG. 8 is a block diagram of the servo detector of the present invention.

A block diagram of the servo detector of the present invention is shown in FIG. 8. A PR4 samples buffer 90 buffers a number of the equalized sample values 32 equal to the number of samples in a servo codeword, plus enough samples to account for the pipeline delay of the servo detector 35. When the servo sync detector 83 detects the servo sync mark 70, a sync detect signal 38 frames the servo codeword samples stored in the PR4 samples buffer 90. The samples of the current servo codeword, denoted $S_0, S_1, \ldots SN$, are retrieved from the PR4 samples buffer 90 and applied over bus 92 to error metric generators $94_0$–$94_N$. Error metric generator $94_0$ computes an error metric $96_0$ by accumulating $98_0$ the squared 100 difference 102 between the read signal sample values $S_0, S_1, \ldots S_N$ and the sample values $C0_0, C0_1, \ldots C0_N$ of the first valid codeword C0 in the servo code. Similarly, error metric generator $94_1$ computes an error metric $96_1$ by accumulating $98_1$ the squared difference between the read signal sample values $S_0, S_1, \ldots S_N$ and the sample values $C1_0, C1_1, \ldots C1_N$ of the second valid codeword C1 in the servo code. The error metrics $96_0$–$96_N$ are then compared by a compare/select circuit 104 which selects the servo codeword that generated the minimum error metric, which is the servo codeword closest to the read signal samples in Euclidean space.

Note that the implementation of the servo detector shown in FIG. does not account for intersymbol interference that can occur at the boundaries of the codewords due to the partial response signaling. This could be accounted for by comparing the read signal samples to all the possible permutations of codewords modified by the effect of intersymbol interference. However, the performance gain would probably not outweigh the attendant increase in cost and complexity. Furthermore, those skilled in the art understand that it is not necessary to implement the circuitry exactly as shown in FIG. 8. There are well known techniques for exploiting certain redundant computations in order to minimize the circuitry. The actual minimization depends on the particular servo code employed.

Another alternative embodiment would be to implement the servo detector of the present invention with a sequence detector having a trellis state machine matched to the codewords of the servo code. In other words, the trellis would be time varying such that at any given time the decision branches would correspond to (i.e., match) the possible valid codewords. Such a detector would still need to be synchronized to the codeword boundaries by the servo sync detector 83 of FIG. 2.

The objects of the invention have been fully realized through the embodiments disclosed herein. Those skilled in the art will appreciate that the aspects of the invention can be achieved through various other embodiments without departing from the essential function. For example, a servo code exploiting the aspects of the present invention could be designed in a signal space other than a partial response signal, and the minimum distance measured in a space other than Euclidean. In particular, the servo code could be implemented using a binary error correction code where the minimum distances $d_{min}$ and $\hat{d}_{min}$ would be measured as a Hamming distance. The particular embodiments disclosed are illustrative and not meant to limit the scope of the invention as appropriately construed by the following claims.

We claim:

1. A sampled amplitude servo detector for detecting servo data recorded on a disc storage medium partitioned into a plurality of concentric data tracks and comprising embedded servo sectors for positioning a read head over the disc storage medium, wherein each servo sector comprises a track address and each track address comprises at least one valid codeword of a servo code, the servo detector comprising:
   (a) a sampling device for sampling an analog read signal emanating from the read head positioned over a servo sector to generate a sequence of read signal sample values; and
   (b) a discrete time sequence defector for detecting a codeword of a track address, comprising:
      (i) a metric generator for generating error metrics between a predetermined number of the read signal sample values and sample values of only valid codewords of the servo code;
      (ii) a comparator for comparing the error metrics according to a predetermined criteria; and
      (iii) a selector, responsive to the comparator, for selecting one of the codewords as the output of the sequence detector.

2. The servo detector as recited in claim 1, wherein the sequence detector operates according to a first minimum distance $d_1^2$ in Euclidean space between valid codewords of the servo code.

3. The servo detector as recited in claim 2, wherein a code rate of the servo code is greater than or equal to ¼.

4. The servo detector as recited in claim 3, wherein the code rate of the servo code is ⅓.

5. The servo detector as recited in claim 2, wherein the sequence detector is configured to detect valid codewords recorded on adjacent tracks that differ by the minimum distance $d_1^2$.

6. The servo detector as recited in claim 5, wherein the sequence detector operates according to a second minimum distance $d_2^2$ between a linear signal space connecting valid codewords representing adjacent track addresses and decision boundaries of all other valid codewords of the servo code.

7. The servo detector as recited in claim 1, further comprising an equalizer for equalizing the read signal sample values according to a predetermined partial response.

8. The servo detector as recited in claim 7, wherein the partial response is a PR4 response.

9. The servo detector as recited in claim 1, wherein the metric generator generates the error metrics in Euclidean space by accumulating a squared difference between the read signal sample values and the sample values of the valid codewords.

10. The servo detector as recited in claim 1, wherein sequence detector operates according to a run-length limited (RLL) d=1 constraint in the recorded track addresses.

11. A sampled amplitude servo detector for detecting servo data recorded on a disc storage medium partitioned into a plurality of concentric data tracks and comprising embedded servo sectors for positioning a read head over the disc storage medium, wherein each servo sector comprises a track address and each track address comprises at least one valid codeword of a servo code, the servo detector comprising:
   (a) a sampling device for sampling an analog read signal emanating from the read head positioned over a servo sector to generate a sequence of read signal sample values; and
   (b) a discrete time sequence detector for detecting said at least one valid codeword of a track address according to maximum likelihood decision boundaries relative to a first minimum distance $d_1^2$ in Euclidean space from other valid codewords of the servo code when the other valid codewords are represented in a partial response class-IV space comprising the sample values +1, 0 and −1.

12. The servo detector as recited in claim 11, wherein the sequence detector operates according to a second minimum distance $d_2^2$ between a linear signal space connecting codewords representing adjacent track addresses and decision boundaries of all other valid codewords of the servo code.

13. The servo detector as recited in claim 11, further comprising an equalizer for equalizing the read signal sample values according to a predetermined partial response.

14. The servo detector as recited in claim 13, wherein the partial response is a PR4 response.

15. The servo detector as recited in claim 11, wherein sequence detector operates according to a run-length limited (RLL) d=1 constraint in the recorded track addresses.

16. A sampled amplitude servo detector for detecting servo data recorded on a disc storage medium partitioned into a plurality of concentric data tracks and comprising embedded servo sectors for positioning a read head over the disc storage medium, wherein each servo sector comprises a track address and each track address comprises at least one valid codeword of a servo code, the servo detector comprising:
   (a) a sampling device for sampling an analog read signal emanating from the read head positioned over a servo sector to generate a sequence of read signal sample values; and
   (b) a discrete time sequence detector for detecting said at least one valid codeword of a track address according to maximum likelihood decision boundaries relative to a first minimum distance $d_1^2$ between all valid codewords and a second minimum distance $d_2^2$ between a linear signal space connecting codewords representing adjacent track addresses and decision boundaries of all other valid codewords when the other valid codewords are represented in a partial response class-IV space comprising the sample values +1, 0 and −1.

17. The servo detector as recited in claim 16, further comprising an equalizer for equalizing the read signal sample values according to a predetermined partial response.

18. The servo detector as recited in claim 17, wherein the partial response is a PR4 response.

19. The servo detector as recited in claim 16, wherein sequence detector operates according to a run-length limited (RLL) d=1 constraint in the recorded track addresses.

20. The servo detector as recited in claim 16, wherein a code rate of the servo code is greater than or equal to ¼.

21. The servo detector as recited in claim 20, wherein the code rate of the servo code is ⅓.

* * * * *